(12) United States Patent
Crookshanks

(10) Patent No.: US 6,831,252 B1
(45) Date of Patent: Dec. 14, 2004

(54) ELECTRIC SOLDERING IRON

(76) Inventor: Dennis M. Crookshanks, 12052 Clark Rd., Chardon, OH (US) 44024

( * ) Notice: Subject to any disclaimer, the term of this patent is extended or adjusted under 35 U.S.C. 154(b) by 0 days.

(21) Appl. No.: 10/762,908

(22) Filed: Jan. 22, 2004

Related U.S. Application Data
(60) Provisional application No. 60/434,595, filed on Jan. 27, 2003.

(51) Int. Cl.$^7$ ................................................. H05B 1/00
(52) U.S. Cl. ...................... 219/229; 219/230; 219/231; 228/51; 228/55
(58) Field of Search ................................. 219/229, 230, 219/231; 228/51, 55

(56) References Cited

U.S. PATENT DOCUMENTS

| | | | |
|---|---|---|---|
| 1,519,246 A | * 12/1924 | Forshee et al. | ............. 219/230 |
| 1,928,522 A | * 9/1933 | Amundsen | .................... 228/55 |
| 2,146,854 A | * 2/1939 | Schleif | ........................ 219/234 |
| 2,162,615 A | * 6/1939 | Harlan | ........................ 219/234 |
| 2,424,848 A | * 7/1947 | Reitan | ........................ 219/233 |
| 2,430,666 A | * 11/1947 | Burger | ........................ 219/233 |
| 2,439,296 A | * 4/1948 | Hawkins | ..................... 219/230 |
| 2,469,479 A | * 5/1949 | Shay | ........................... 219/240 |
| 2,689,901 A | * 9/1954 | Obolensky | .................. 219/230 |
| 2,692,935 A | * 10/1954 | Pearce et al. | ............... 219/230 |
| 3,089,020 A | * 5/1963 | Hurlebaus | ................ 219/56.21 |
| 3,697,724 A | 10/1972 | Hombrecher | |
| 3,851,145 A | 11/1974 | Fukanaga | |
| 3,911,246 A | 10/1975 | Drinkard, Jr. | |
| 3,945,553 A | 3/1976 | Nicosia | |
| 4,013,208 A | 3/1977 | Mason et al. | |
| 4,045,651 A | 8/1977 | Koo | |
| 4,251,043 A | 2/1981 | Horner | |
| 4,330,075 A | 5/1982 | Rosen | |
| 4,473,181 A | 9/1984 | Grabow, Jr. | |
| 4,591,696 A | 5/1986 | Eisen | |
| 4,671,476 A | 6/1987 | Yim | |
| 4,678,886 A | 7/1987 | Kawaguchi | |
| 4,779,786 A | * 10/1988 | Holdway | ................... 228/20.5 |
| 4,793,541 A | 12/1988 | Dravnieks | |
| 4,805,830 A | 2/1989 | Kawaguchi | |
| 4,896,019 A | 1/1990 | Kyun | |
| 4,932,393 A | 6/1990 | Sim | |
| 5,019,688 A | 5/1991 | Cheng | |
| 5,031,817 A | 7/1991 | Chen | |
| 5,261,590 A | 11/1993 | Tsai | |
| 5,542,600 A | 8/1996 | Kobayashi et al. | |
| 5,690,847 A | 11/1997 | LaValley et al. | |
| 6,646,228 B2 | * 11/2003 | Axinte et al. | ............... 219/231 |
| 2002/0047001 A1 | 4/2002 | Axinte et al. | |

* cited by examiner

Primary Examiner—Robin O. Evans
Assistant Examiner—Vinod Patel
(74) Attorney, Agent, or Firm—James A. Lucas; Driggs, Lucas, Brubaker & Hogg Co., LPA

(57) ABSTRACT

An electric soldering iron useful for heavy duty applications, such as sheet metal lamination, comprises a soldering tip held between two carbon electrodes which are electrically connected through busses to a source of low voltage, variable amperage current. The carbon electrodes are preferably graphite. An additional feature allows the tip to pivot to various angles with respect to the handle to provide optimum comfort and soldering efficiency. The body of the soldering tip is provided with longitudinal grooves into which the shaped carbon electrodes are slid and are secured in place with suitable fasteners, such as bolts. Alternatively, the electrodes may have a contour corresponding to the surface of the body of the soldering tip and are then clamped or otherwise secured to the body. Another option is to use electrodes that are shaped as cylindrical plugs seated in blind recesses in the body of the soldering tip.

14 Claims, 3 Drawing Sheets

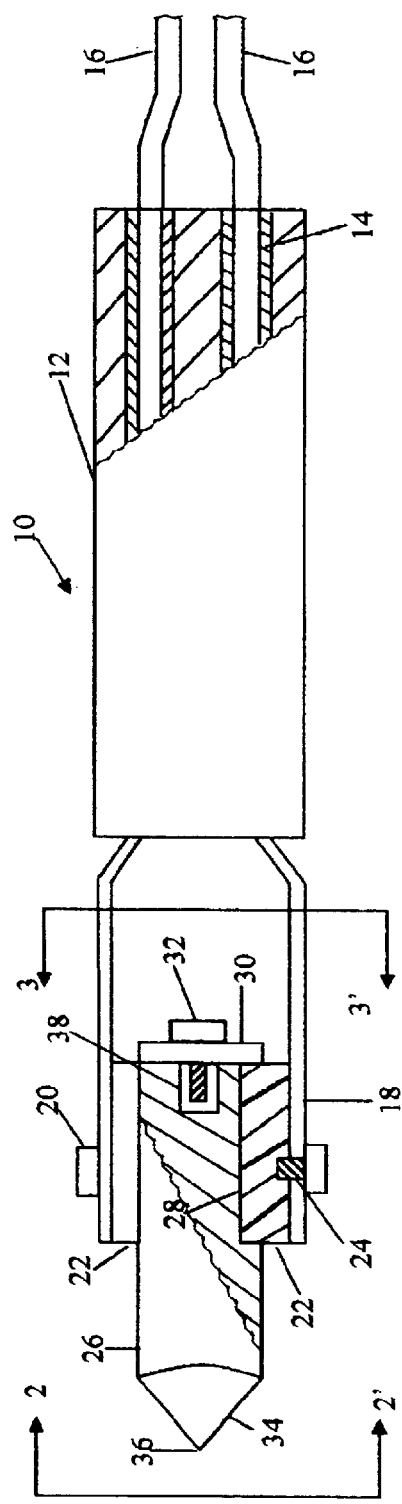

ELECTRIC SOLDERING IRON

CROSS-REFERENCE TO RELATED APPLICATIONS

This application claims the benefits of provisional patent application Ser. No. 60/434,595, filed Jan. 27, 2003.

FIELD OF THE INVENTION

This invention relates to an electrically heated soldering iron, in which the heat is generated in the soldering tip by electrical resistance.

BACKGROUND OF THE INVENTION

Soldering is a well known method of joining two or more metals together using a metallic solder having a low eutectic temperature. The solder is heated until it is liquefied, and the metals to be joined are also heated. The solder is introduced into the interface between the metals where it cools and solidifies to securely bond the metals through the interface.

One method of soldering involves melting a quantity of solder using an open flame, such as a blow torch. The flame also heats the end or 'bit' of the soldering iron which is then used to apply heat to the interface as solder is poured into the interface. The bit can be in the shape of a pencil point or rounded point, or a blade, depending on the specific application. Although this technique has been in use for many years, the use of in open flame around combustible materials can create a potential fire hazard, thereby limiting its usefulness.

In addition to the use of an open flame to melt the solder, and to heat the soldering tip and substrate, there are other ways of achieving the same objective. One such approach is to use an electric current to heat the soldering iron by resistance heating. Various types of soldering tips can be used. For example, a split tip can be applied to a metallic substrate to complete an electric circuit causing the tip and the surrounding surface to reach operating temperature quickly. Concurrently, the low melting temperature solder is introduced to the heated surface of the substrate where the solder melts, flows, and subsequently is allowed to cool.

SUMMARY OF THE INVENTION

Using an electrical transformer, a low voltage-high amperage electrical current is passed through copper wire, steel conductors (buss bars), and graphite electrodes into a metal soldering tip. Electrical resistance in the solder tip produces heat that is transmitted to the bit and then to the surface of the materials to be soldered. The soldering tip can be pivoted with respect to the handle, enabling the user to solder at multiple angles to the work piece.

The present invention relates to a soldering iron. The iron comprises a soldering tip and a pair of conductors in electrical contact with the soldering tip, the conductors preferably comprising a form of carbon adapted to be connected to a source of electrical current that passes through the conductors to generate heat within the soldering tip. Each carbon conductor is an electrode that may be secured to a buss bar utilizing a fastener. The electrodes may have a trapezoidal cross-sectional shape that engages a corresponding slot in the soldering tip. Alternatively, they may have a surface that conforms to and frictionally engages the axial surface of the soldering tip. The soldering iron includes a suitable handle which enables the user to safely and comfortably use the soldering iron without the risk of being burned. The soldering iron may further be provided with a pivot structure to permit the user to adjust the angle of the soldering tip with respect to the handle.

The invention further relates to a method of using an electrical soldering iron to solder contiguous metal pieces together, or, for example, to seal a leak in a metal pipe or conduit. The soldering iron comprises a soldering tip, having a longitudinally extending body joined to a source of electrical current. A handle permits the user to manipulate the soldering iron to solder according to the invention. The method comprises the following steps:

When joining metal pieces together, the pieces to be joined by solder are juxtaposed next to one another. These pieces typically may comprise pieces of sheet metal of the type that is used for roofing or for gutters. The body of the soldering tip is secured between a pair of shaped carbon electrodes and an electrical current is passed through the electrodes to heat the tip to soldering temperature. The solder is flowed onto the juxtaposed pieces. The solder is allowed to cool to join the pieces together. In one embodiment, the step of securing the body between the electrodes includes the added steps of providing two diametrically opposed, blind, longitudinal slots in the body, and inserting the carbon electrodes into the slots. The electrodes may be secured to the body using an insulated washer, such as a ceramic disc screwed into the flat end of the body. Means may also be included to permit the soldering tip and electrodes to be pivoted with respect to the handle. When being used to repair a leak, the soldering iron is used to heat the metal surface around the leak and to heat the solder, causing it to flow into the hole causing the leak. When the iron is withdrawn, the solder solidifies to seal the hole.

In another embodiment, the electrodes are shaped by machining or molding or other suitable means to conform them to the body perimeter of the soldering tip. Then the electrodes are clamped to the body. This permits the electrodes to be unclamped to allow longitudinal adjustment of the soldering tip with respect to the electrodes.

In yet another embodiment, the two electrodes are cylindrical plugs that are inserted into corresponding holes on opposite sides of the body of the soldering tip. The electrodes are bolted or otherwise joined to the buss bars so that the electrodes and the soldering tip can be rotated with respect to the buss bars by loosening the bolts or other fasteners for rotation and then tightening the same to fix the angle of rotation. The electrodes may be externally threaded and screwed into the body. Alternatively, they may be cemented in place or press fit into the corresponding holes.

The invention further covers a device for the resistance soldering of heavy pieces, such as sheet metal. The device includes a source of low voltage electrical current, such as a step-down transformer. It furthermore comprises a soldering iron with a soldering tip having a longitudinally extending body terminating in a point. The body is round, oval or polygonal in cross-section. The iron also has a pair of graphite electrodes joined to the source of low voltage electrical current and electrically coupled to the body of the soldering tip. A handle is provided with which to safely hold the soldering iron during use. The body of the soldering tip includes two blind, longitudinally extending slots positioned peripherally on opposite sides of the body. The graphite electrodes are conformally shaped to fit into the slots and are held in place by an insulated washer secured to the body of the soldering tip. The washer preferably is a ceramic disc secured to the body with a bolt or other fastener threaded into a hole tapped into a flat end of the soldering tip opposite the bit. The electrodes and the body of the soldering tip may be made to be pivotally movable with respect to the handle. This is achieved by using a pair of buss bars threadedly joined to the electrodes with threaded connectors whereby the connectors may be loosened to permit relative rotation between the handle and the electrodes. Instead of the graphite electrodes fitting into slots in the body of the soldering tip, the electrodes may be shaped to conform to the periphery of the body. A suitable clamping device is used to secure the body between the electrodes and to either permit or to limit relative movement of the body with respect to the electrodes. By loosening the clamping means, the body may be slid longitudinally between the electrodes to either extend or to shorten the overall length of the soldering iron. As another alternative, the two electrodes are shaped as cylindrical plugs that fit into corresponding holes on opposite sides of the soldering tip. The electrodes are bolted or otherwise joined to the buss bars so that the electrodes and the soldering tip can be rotated with respect to the buss bars by loosening the bolts or other fasteners and then tightening the same to fix the angle of rotation.

BRIEF DESCRIPTION OF THE DRAWINGS

FIG. 1 is a side elevational view of a soldering iron, partially in cross-section;

FIG. 2 is a view taken long lines 2–2' of FIG. 1;

FIG. 3 is a view taken along lines 3–3' of FIG. 1, shown partially in cross-section;

DETAILED DESCRIPTION OF THE INVENTION

Figure 6:
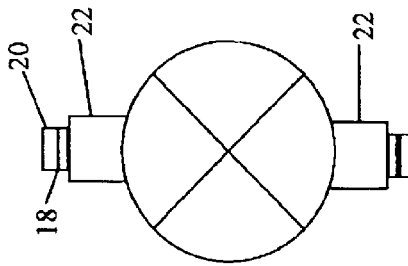
FIG. 6 is a view taken along lines 6–6' of FIG. 5.

FIG. 1 shows an electrically heated soldering iron (10) of the present invention.

Two sheathed copper wires (16) conduct current from a power unit (not shown), including a low voltage-high current electric transformer, such as one marketed by Assembly Technologies, Inc. The transformer serves to convert electrical current from 110 volt alternating current to 7–12 volts. The output of the low voltage current can range from 0 to 250 amps.

A handle (12) of wood, cork or plastic with high insulating properties is used to permit the user to comfortably grasp the device without burning the user's hand. Two tubes (14) contain the sheathed copper wires aid are used for securing the copper wires to steel conductors or buss bars (18). These tubes typically are made from a metal, such as stainless steel, that is corrosion resistant, is not damaged by the electrical currents, and can withstand the heat generated in the device. The tubes serve to separate the copper conductive wires from one another and from the handle.

One end of each of the buss bars (18) is secured to the copper wire (16) and steel tube (14) by crimping, and the other end of each buss bar has a hole for fastening to the graphite electrodes. Two steel bolts (20), or other fasteners such as machine screws, are used for coupling the graphite electrodes (22) to the steel buss bars (18). Care must be maintained to insure that the bolts extend into the graphite electrodes, without contacting the soldering tip (26). The two graphite electrodes (22) each have a tapped hole (24) for fastening to the steel buss bars (18). The graphite electrodes are formed with a trapezoidal, cross-sectional shape to fit a corresponding blind recess or slot (28) in the soldering tip.

The soldering tip (26) preferably comprises copper that is plated with a nickel and chromium layer. In one embodiment, the soldering tip has two milled trapezoidal recesses or blind slots (28) to accept the graphite electrodes (22) that are slid into the slots. It is contemplated that the soldering tip (26) is selected for use in heavy duty applications for soldering sheet metal and ornamental metal shapes. The thickness of the soldering tip can be one-half inch dr larger, with a cross-section that is round, oval, hexagonal or other shape consistent with established practices. The soldering tip tapers down at (34) to form a solder contact bit (36) shaped as a pencil point, a round tip, or a knife edge, depending on the end use application of the iron. The soldering tip (26) has a tapped hole (38) at the rear, opposite the solder contact bit (36) to receive a ceramic disc (30). The disc serves as an insulator, and covers the open end of the slots (28) to hold the graphite electrodes (22) securely in the slots (28). The disc is secured to the soldering tip by a bolt (32) threaded into the tapped hole (38). Instead of ceramic, any satisfactory insulator having the requisite mechanical and electrical properties can be used for this purpose.

FIG. 2 shows a front view of the soldering tip and graphite electrode assembly, and FIG. 3 shows a rear view. The front view shows the soldering tip (26) with a bit (36) producing a pencil point formed by the confluence of four beveled surfaces (34). Also shown in a cut away view of FIG. 3 is the trapezoidal cross-sectional shape of the graphite electrodes (22). Each electrode (22) is positioned in the slot (28) in the soldering tip (26) and is secured to the buss bar (18) by a bolt (20) threaded into hole (24). The graphite electrodes (22) are prevented from sliding out of slots (28) by retaining disc (30), preferably made of a ceramic material, and held in place by a bolt (32) threaded into the soldering tip (26).

Figure 4:
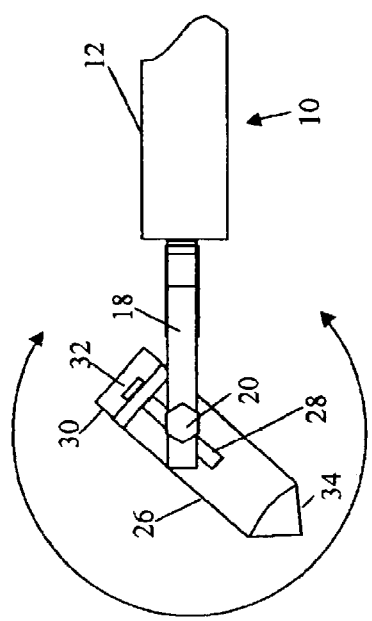
FIG. 4 is a view of another feature of the soldering iron.

FIGS. 4–8 illustrate the rotational possibilities of the soldering tip as another feature of the present invention. As shown in FIG. 4, the soldering tip (26) contains slots (28) into which the two graphite electrodes (22) are slid and are held in place by an insulator disc (30) secured by a bolt (32) threaded into the rear of the soldering tip. The graphite electrodes are pivotally secured between the two steel buss bars (18) by a pair of bolts (20) threaded into the electrodes. The buss bars (18) are electrically connected to copper wire extending through tubes (not shown) in the handle (12). By loosening the bolts (20), the soldering tip (26) can be pivoted through an arc of nearly 360°. When a satisfactory angle between the handle and the soldering tip is reached, the bolts (20) are tightened by hand (care being taken to avoid shocks or burns) or with a tool, such as a wrench, to maintain the angle during use of the soldering iron (10). Care should be used in applying torque to the bolts so as not to crush or otherwise damage the carbon electrodes.

Figure 5:
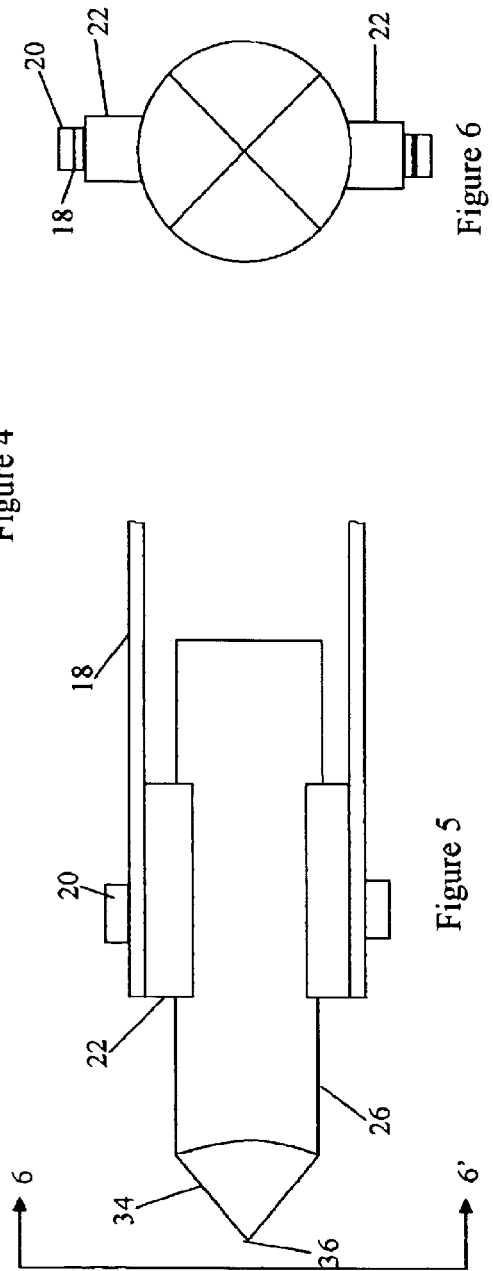
FIG. 5 is a side elevational view showing yet another feature of the invention.

FIGS. 5 and 6 show an alternative configuration of the soldering tip (26) and graphite electrodes (22) wherein the electrodes are milled or shaped to conform to the cross-sectional shape of an existing soldering tip, allowing the soldering tip to be adjusted lengthwise and to be rotated with respect to the handle. As shown in FIG. 6, the soldering tip (26) is circular in cross-section, and the graphite electrodes (22) are machined to provide a semi-circular surface that conforms in radius to that of, the soldering tip. Thus, by loosening the bolts (20), the soldering tip (26) and the graphite electrodes (22) can be rotated about the axis defined by the buss bars (18) and the handle (not shown). At the same time, the soldering tip can also be slid in an axial direction between the electrodes toward or away from the handle. This feature may be used to increase the overall length of the soldering iron where necessary. When the bolts are tightened, the curved surface of the electrodes frictionally contacts the surface of the soldering tip to prevent further rotation and axial movement.

Figure 7:
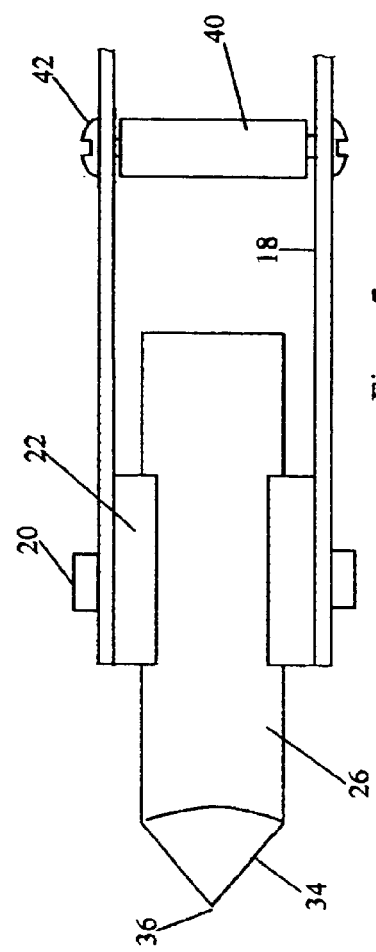
FIG. 7 shows another embodiment of the present invention.

The two buss bars (18) should be clamped or otherwise kept from spreading apart, such as with an insulated clamp, to keep the graphite electrodes firmly engaging and clasping the soldering tip. Other means such as spring clamps for securing the electrodes to grip the body of the solder tip can likewise be used. A simple clamping arrangement for the graphite electrodes is shown in FIG. 7. The clamping is achieved by the use of a ceramic sleeve (40) placed between the two buss bars (18) and secured thereto by suitable means, such as a pair of machine screws (42) threaded into the cylinder, or by use of other comparable fastening devices. By loosening one or both of the screws (42) and the bolts (20), the soldering tip (26) can be slid in an axial direction within the graphite electrodes (22). By loosening only the bolts (20) securing the buss bars (18) to the electrodes (22), the electrodes and soldering tip (26) can be rotated about the axis passing through the bolts.

Figure 8:
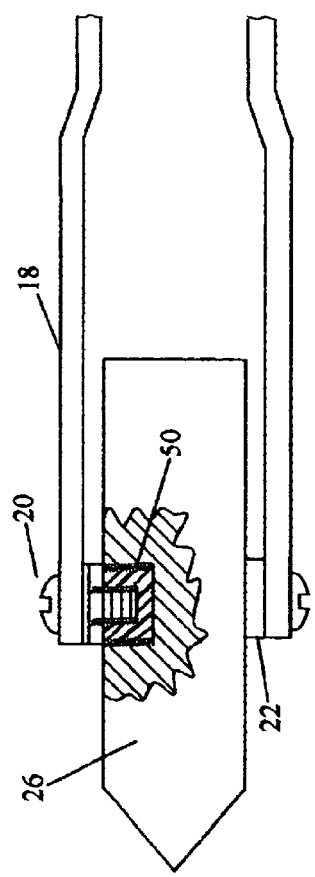
FIG. 8 shows yet another embodiment, partially in cross-section, of the present invention.

FIG. 8 shows another variation that uses a pair of smaller carbon electrodes, thereby reducing the overall weight of the soldering iron, and providing an improvement in its mobility. The two carbon electrodes (22) are in the shape of cylindrical plugs that are provided with external threads (50) to enable the electrodes to be threaded into corresponding blind holes machined or molded into the body of the soldering tipi (26). Preferably, but not necessarily, the blind holes are located at diametrically opposite sides of the solder tip body. The carbon plugs are internally tapped to form a blind hole into which a machine screw (20) is threaded to hold each electrode to a buss bar (18). As before, the buss bar is joined to conductive copper leads that pass through a handle (not shown) to be connected to a source of low voltage, high amperage electric current. As an example, for a soldering tip having a 1⅛ inch thick body, a pair of ½ inch diameter by ½ inch thick graphite electrodes are threaded into opposite sides of the soldering tip to a depth of ⅜ inch. The buss bars are coupled to the electrodes using 5/16 inch ×½ inch machine screws or comparable fasteners. Also, as previously noted, the screws (20) should not extend into the body of the solder tip. Instead of threading the carbon plugs into the body of the soldering tip, they may be press fit or cemented into place using a suitable graphite-epoxy cement or other high temperature cement. In this manner, the plugs and the corresponding blind recesses need not be cylindrical but may be square or other appropriate shape.

It should be understood that the present description and the drawings are intended to be illustrative of the present invention without being limiting thereof. Instead, all variations in the design, in the materials of construction, and in the relative sizes of the various components are likewise intended to be included within the scope of this disclosure. Generally, larger electrodes hold up better under heat than smaller electrodes. However, the heat transfer appears to be independent of the electrode size. The carbon electrodes can be treated, impregnated or blended with additives to improve their performance. One such improvement includes coating the electrode with a ceramic graphite coating to give more heat resistance. Another is to embed copper particles or other conductive particles in the carbon to increase the wear resistance to threads or fasteners in the carbon.

The soldering iron is generally intended to be used for the rapid deployment of heat to relatively large surfaces and, thus, will likely be using a soldering tip with a body having a cross-sectional thickness between about ½ inch and 1¼ inch or more. For such applications, the radial thickness of the carbon electrodes may be between about ¼ inch and ¾ inch.

When used for soldering sheet metal, such as heavy duty sheet copper used for roofing and gutters and having a weight of 16–20 ounces, the use of this invention can result in a 30% to 50% saving in time over the use of traditional soldering equipment. For instance, the device can solder a seam in the sheet copper at a rate of up to eight inches per minute. Furthermore, the device is lighter in weight than the soldering irons presently on the market. Also, it is safer than soldering irons that rely on a flame to heat the solder. The body of the soldering tip can be conical or hexagonal rather than square, which is the shape of many of the soldering tips presently on the market.

In all instances, proper procedures must be followed to adequately prepare the metal surface or surfaces for soldering, using procedures that are well known in the industry. This includes the removal of all wax, grease and other debris from the surfaces to be joined. It is understood that the surface preparation does not constitute a part of the claimed invention, but is an important step in ensuring that the soldering is carried out successfully.

In addition, it is intended that a suitable heat shield may be provided between the handle and the soldering iron tip to minimize the likelihood of burning or blistering the hand. Such a heat shield is of customary design as is well known to the skilled artisan.

While the invention has been described in combination with embodiments thereof, it is evident that many alternatives, modifications and variations will be apparent to those skilled in the art in light of the foregoing teachings. Accordingly, the invention is intended to embrace all such alternatives, modifications and variations as fall within the spirit and scope of the invention as defined by the appended claims.

What is claimed is:

1. A resistance soldering iron comprising:
   a soldering tip having a longitudinally extending body terminating in a bit, said body including a pair of longitudinally extending trapezoidal slots; and
   a pair of conductors in contact with the body of the soldering tip, the conductors comprising carbon electrodes adapted to be connected to a source of electrical current to generate heat within the soldering tip when the conductors are connected to a source of electricity, each carbon electrode having a trapezoidal cross-sectional shape and engaging one of the slots in the body of the soldering tip.

2. The soldering iron of claim 1 further including a handle to permit grasping of the soldering iron.

3. The soldering iron according to claim 2 further provided with a pivot feature to permit a user to adjust the angle of the body of the soldering tip and the electrodes with respect to the handle.

4. The soldering iron according to claim 3 wherein each carbon electrode is a graphite electrode that is pivotally secured to a buss bar utilizing a fastener.

5. The soldering iron according to claim 1 wherein the soldering iron includes clamping means for frictionally engaging the electrodes with the body when tightened and for permitting the body to slide in a longitudinal direction with respect to the electrodes when loosened.

6. A method of using an electrical resistance soldering iron composed of a soldering tip, having a longitudinally extending body terminating in a bit, to solder contiguous metal pieces together, comprising the steps of:

a) providing two diametrically opposed, blind, longitudinal slots in the body of the soldering tip, said slots each having a trapezoidal shape;

b) providing carbon electrodes with a trapezoidal shape corresponding to the shape of the slots into the slots;

c) inserting the electrodes into the slots and securing the electrodes in the slots using an insulated disc attached to the body of the soldering tip, and covering the opening of each slot;

d) passing electrical current through the electrodes to heat the bit to soldering temperature;

e) juxtaposing the metal pieces to be joined by solder;

f) flowing solder that has been heated and liquefied by the soldering iron onto the juxtaposed pieces; and g) allowing the solder to cool to join the pieces together.

7. The method according to claim 6 wherein the pieces to be joined are sheet metal.

8. The method according to claim 6 further including the step of providing a handle to permit the soldering iron to be hand held during soldering.

9. The method according to claim 8 further including the step of providing means to permit the soldering tip to be pivoted with respect to the handle.

10. The method of claim 6 including the step of clamping the electrodes to the body.

11. The method according to claim 10 further including the step of unclamping the electrodes to permit longitudinal adjustment of the soldering tip with respect to the electrodes.

12. A device for the resistance soldering of sheet metal comprising:

a) a source of low voltage electrical current; and b) a soldering iron having 1. a soldering tip comprising a longitudinally extending body terminating in a bit, said body including two opposed, blind longitudinal trapezoidal shaped slots, 2. a pair of carbon electrodes joined to the source of low voltage electrical current, each of the electrodes having a trapezoidal cross-sectional shape and engaging one of the slots in the body of the soldering tip; and 3. a handle with which to safely hold the soldering iron.

13. The device according to claim 12 wherein the electrodes and the body of the soldering tip are rotationally movable with respect to the handle.

14. The device according to claim 12 wherein clamping means are used to secure the body between the electrodes and to either permit or to limit relative axial movement of the body with respect to the electrodes.

* * * * *